Figure 1:
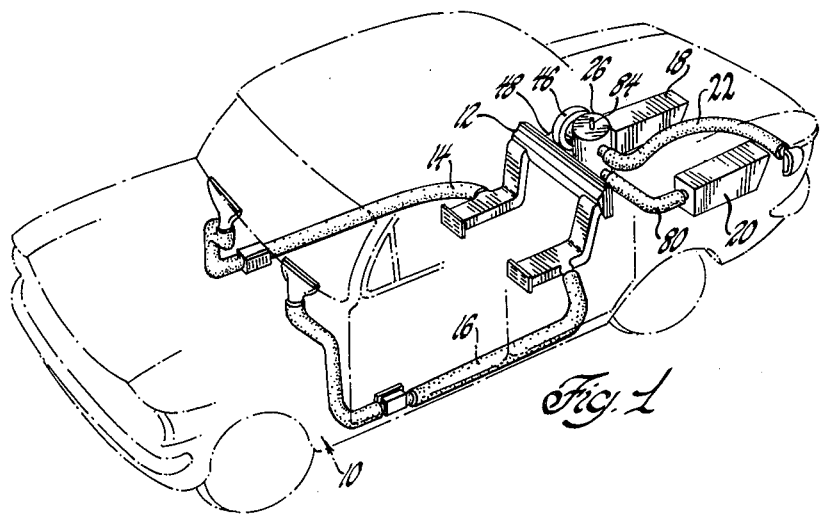

Sept. 21, 1965  F. C. BURRELL  3,207,439
AUTOMOTIVE AIR MIX HEATER CONTROL ARRANGEMENT
Filed July 11, 1963

INVENTOR.
Frank C. Burrell
BY George E. Johnson
ATTORNEY

United States Patent Office 3,207,439
Patented Sept. 21, 1965

3,207,439
AUTOMOTIVE AIR MIX HEATER CONTROL ARRANGEMENT
Frank C. Burrell, Orchard Lake, Mich., assignor to General Motors Corporation, Detroit, Mich., a corporation of Delaware
Filed July 11, 1963, Ser. No. 294,352
4 Claims. (Cl. 237—2)

This invention relates to vehicle heating and more particularly to a control arrangement for automobile passenger compartment heating in which the energy for operation is the heat derived as waste heat from an air cooled engine.

A very satisfactory heating system used in combination with an air cooled engine is disclosed in the United States application for Letters Patent Serial No. 53,797, filed September 2, 1960, in the names of E. N. Cole and R. M. Johnston, now Patent Number 3,096,938. A difficulty has, at times, been experienced in controlling the temperature in the passenger compartment because the car and the engine run at varying speeds. These varying speeds result in blowing engine cooling air into the car at varying pressure and an attempt to mix this heated air with cooler air in such proportions as to secure a desired passenger compartment temperature has not always met with unqualified success.

An object of the present invention is to provide a control arrangement in an automobile by means of which heated air from an air cooled engine may be mixed with cooler air in such proportions that a desired air temperature in a passenger compartment may be attained despite variations in speed of the car or the engine.

To this end, a feature of the invention is a control arrangement for mixing heated air and cooler air in which arrangement a proportioning valve operation is automatically regulated in accordance with the pressure differential between the sources of air supply.

These and other important features of the invention will now be described in detail in the specification and then pointed out more particularly in the appended claims.

Figure 2:
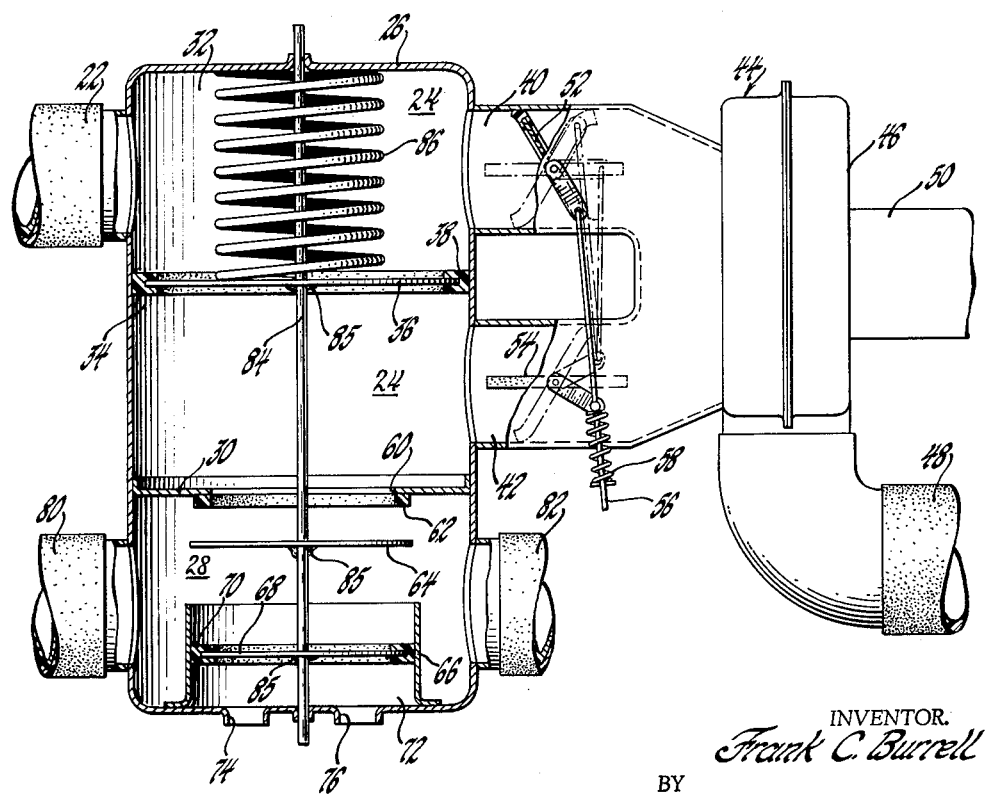

In the drawings:

FIGURE 1 is a perspective view of an automobile drawn in dot and dash lines, the car being of the rear air-cooled engine type and in which a heating system is installed using the control arrangement of the present invention, the system being shown in full lines; and FIGURE 2 is a view, partly in section and drawn to a larger scale, of the control arrangement utilized in the heating system of FIGURE 1.

The car 10 shown in FIGURE 1 has a hot air distribution duct characterized by a distributor casing 12 mounted at the rear of the passenger compartment and two distributor air conduits 14 and 16. The engine is provided with two hot air sources 18 and 20 each of which derives heated air from the finned exteriors of a bank of air cooled engine cylinders. A cooler air heating system intake is shown at 22.

The cooler air intake 22 is connected to a first air chamber 24 formed in the upper portion of a cylindrical casing 26. The casing also has a heated or second air chamber 28 located in its lower portion and that is separated from the first air chamber 24 by a fixed partition 30. The first air chamber 24 is also divided into two variable spaces 32 and 34 by a large movable disk 36 which is shown as adapted to serve as a piston having a periphery of resilient sealing material 38. The disk 36 is interposed between two spaced air outlets 40 and 42 communicating with the first air chamber 24. The air outlets 40 and 42 lead to a mixing housing generally indicated at 44. Conveniently, this housing includes a blower casing 46 for an outlet conduit 48 leading to the distributor 12. The rotor in the blower 46 is actuated by a motor partially shown at 50. Dampers 52 and 54 are mounted in the outlets 40 and 42 respectively and in such a way as to be operated by a common rod 56. These dampers 52 and 54 are so arranged as to operate in reverse to each other in order that air flow can be adjusted or proportioned between the two outlets i.e. that either damper may be closed while the other is opening. A spring 58 is utilized so that the dampers may be simultaneously closed—i.e.—so that the damper seating first will be held closed by the spring as the other damper closes. Suitable push-pull provision can be made to operate the rod 56 from the instrument panel of the vehicle but such subject matter does not form a part of the present invention. It is clear that the rod 56 could be operated automatically by thermostatic means or manually.

The partition 30 in the casing 26 bears a central port 60 having a resilient seat member 62 against which the peripheral margin of a valve disk 64 is adapted to seat. A cylindrical sleeve 66 is fixed to the bottom end wall of the casing 26 and extends into the heated air or second chamber 28 and within the sleeve 66 is mounted a movable wall or disk 68 having a sealing periphery 70 slidably engaging the interior wall surface of the sleeve. The wall or disk 68 is smaller than the disk 36 and serves to separate from the heated air or second chamber 28 a vent space 72 which is in communication with the atmosphere. Multiple vents 74 and 76 are shown as formed in the end wall of the casing 26 but the number of vents and the size of each are mere matters of design. The heated air or second chamber 28 is open to the port 60 in accordance with the position of the valve disk 64 and is also in communication with two heated air inlet conduits 80 and 82. These two conduits communicate with the hot air sources 20 and 18 respectively. The two chambers 24 and 28 may be called "main chambers" and the main chamber 24 may be said to be divided by the disk 36 into "secondary chambers" 32 and 34.

A vertical rod 84 passes through the end walls of the casing 26 and is slidable with respect thereto. The movable walls or disks 36 and 68 as well as the valve disk 64 are fixed to the rod 84 as by welding 85 so that they may move simultaneously with the rod. A coil spring 86 is arranged in the variable space 32 urging the rod and the valve 64 as well as the walls 36 and 68 in a direction which would serve to open the port 60 and simultaneously reduce the size of the variable space 34.

In the operation of the air mixing arrangement, cooler air or atmospheric air enters the upper end of the casing 26 by way of the conduit 22 and heated air from the engine enters the lower end of the casing 26 by way of the conduits 80 and 82. The pressure of the heated air in the second space 28 will vary dependent upon the engine or vehicle speed. If this heated air pressure increases, the wall or disk 36 will move upwardly thereby to compress the spring 86 and thereby causing the port valve 64 to move toward its closed position. This would restrict the flow of heated air by the damper 54. The cooler air pressure in the variable space 32 may also increase. This increase in pressure acts on the cold side of the wall or disk 36 and tends to open the port valve 64 to increase the hot air flow to the variable space 34. The movable wall or disk 68 serves merely to balance the valve arrangement so that the heated air pressure in the second space 28 will not tend to close the port valve 64.

With the dampers positioned to secure an effective air-mix temperature, variations in pressure in either the cooler air supply or the heated air supply will be compensated by the differential pressures and a constant and even temperature may be obtained for the car interior.

I claim:

1. A heating system for a vehicle passenger compartment, said system including an air flow control comprising a casing, a partition in said casing dividing the latter into two predetermined main chambers, movable means dividing one of said main chambers into two variable secondary chambers, valve means connecting said two main chambers, means connecting said movable means to said valve means for operating the latter by means of a differential pressure in said one main chamber, a source of cool air connected to one of said secondary chambers, a source of heated air connected to the other of said main chambers, a mixing chamber, a blower connected to said mixing chamber for discharging mixed air from the latter, damper control means separately connecting said secondary chambers to said mixing chamber for selectively proportioning air flow from said secondary chambers, and spring means biasing said valve means toward open position.

2. A vehicle heating system including a control arrangement for mixing heated and cooler air in proportions to provide air at a desired temperature, said arrangement comprising a source of cool air, a source of heated air, a casing with two chambers each connected to one of said sources, a housing defining a mixing chamber and including a blower, a large movable wall separating one of said chambers into two variable spaces, damper controlled means connecting said mixing chamber to said two variable spaces at opposite sides of said movable wall, one of said two spaces enclosing spring means and the other being connected to the other of said two casing chambers by a port, a port valve controlling said port and located in said other casing chamber, a sleeve in said other casing chamber and joined to an end wall of said casing, a small movable wall in said sleeve and cooperating with the latter and said end wall in defining a space vented to atmosphere, a rod connecting said large and small movable walls and port valve for movement therewith as a unit, and said spring means being adapted to urge said port valve toward open position.

3. A control arrangement as set forth in claim 2 in which said source of cool air is connected to the said one space enclosing the said spring means.

4. A control arrangement as set forth in claim 2 in which said damper controlled means comprises two conduits and two dampers, one of said dampers being in each conduit, and means for simultaneously and inversely operating said two dampers for proportioning the cool and heated air to be mixed by said blower to attain air at a desired temperature.

References Cited by the Examiner

UNITED STATES PATENTS

| 2,400,117 | 5/46  | Holthouse    | 237—2   |
| 2,412,071 | 12/46 | Warner et al. | 237—11 |
| 2,654,580 | 10/53 | Shaw         | 165—31  |
| 2,997,240 | 8/61  | Kreuttner    | 236—13  |

FOREIGN PATENTS 606,003   9/60   Canada.

EDWARD J. MICHAEL, *Primary Examiner.*